United States Patent
Matsumoto

(10) Patent No.: US 11,803,982 B2
(45) Date of Patent: Oct. 31, 2023

(54) IMAGE PROCESSING DEVICE AND THREE-DIMENSIONAL MEASURING SYSTEM

(71) Applicant: OMRON Corporation, Kyoto (JP)

(72) Inventor: Shinya Matsumoto, Osaka (JP)

(73) Assignee: OMRON CORPORATION, Kyoto (JP)

( * ) Notice: Subject to any disclaimer, the term of this patent is extended or adjusted under 35 U.S.C. 154(b) by 206 days.

(21) Appl. No.: 17/272,919

(22) PCT Filed: Mar. 14, 2019

(86) PCT No.: PCT/JP2019/010590
§ 371 (c)(1),
(2) Date: Mar. 2, 2021

(87) PCT Pub. No.: WO2020/183711
PCT Pub. Date: Sep. 17, 2020

(65) Prior Publication Data
US 2022/0398760 A1 Dec. 15, 2022

(51) Int. Cl.
*G06T 7/593* (2017.01)
*G06V 10/74* (2022.01)
*G06T 5/50* (2006.01)

(52) U.S. Cl.
CPC ............ *G06T 7/593* (2017.01); *G06T 5/50* (2013.01); *G06V 10/761* (2022.01);
(Continued)

(58) Field of Classification Search
CPC . G06T 7/593; G06T 5/50; G06T 2207/10012; G06T 2207/10021;
(Continued)

(56) References Cited

U.S. PATENT DOCUMENTS 11,348,271 B2 * 5/2022 Matsumoto ............ G06T 7/521
2006/0056727 A1 3/2006 Jones
(Continued)

FOREIGN PATENT DOCUMENTS

JP H05303629 A 11/1993
JP 2011013706 A 1/2011
(Continued)

OTHER PUBLICATIONS

Extended European Search Report issued in in European Appln. No. 19919470.5 dated Feb. 14, 2022.
(Continued)

*Primary Examiner* — Mekonen T Bekele
(74) *Attorney, Agent, or Firm* — ROSSI, KIMMS & McDOWELL LLP

(57) ABSTRACT

An image processing device includes a setting unit configured to estimate a disparity between a first image and a second image based on a method different from stereo matching and set, based on the disparity thus estimated, a search range for a corresponding point for the stereo matching, a disparity map generating unit configured to search only the search range thus set for a corresponding point of each pixel between the first image and the second image and generate a disparity map, and a disparity map compositing unit configured to composite a plurality of the disparity maps each generated from a corresponding one of a plurality of image pairs.

11 Claims, 14 Drawing Sheets

(52) U.S. Cl.
CPC ............... *G06T 2207/10012* (2013.01); *G06T 2207/10021* (2013.01); *G06T 2207/10144* (2013.01); *G06T 2207/10152* (2013.01); *G06T 2207/20221* (2013.01); *G06T 2207/30244* (2013.01)

(58) Field of Classification Search
CPC . G06T 2207/10144; G06T 2207/10152; G06T 2207/20221; G06T 2207/30244; G06T 7/52; G06V 10/761; G01B 11/2545
See application file for complete search history.

(56) References Cited

U.S. PATENT DOCUMENTS

| | | |
|---|---|---|
| 2006/0140510 A1 | 6/2006 | Wallace |
| 2010/0328427 A1 | 12/2010 | Sakano |
| 2012/0257016 A1 | 10/2012 | Nakajima |
| 2014/0153816 A1 | 6/2014 | Cohen |
| 2015/0178936 A1 | 6/2015 | Boisson |
| 2018/0189975 A1 | 7/2018 | Inada |

FOREIGN PATENT DOCUMENTS

| | | |
|---|---|---|
| JP | 2012248221 A | 12/2012 |
| JP | 2017045283 A | 3/2017 |

OTHER PUBLICATIONS

Choi. "Hybrid Approach for Accurate Depth Acquisition with Structured Light and Stereo Camera.", IEEE International Symposium on Broadband Multimedia Systems and Broadcasting (BMSB). Jun. 27, 2012: 1-4.

Li. "Accurate Depth Estimation Using Structured Light and Passive Stereo Disparity Estimation.", 18th IEEE International Conference on Image Processing (ICIP). Sep. 11, 2011: 969-972.

Um. "Depth map-based disparity estimation technique using multi-view and depth camera.", Proceedings of SPIE. Jan. 2006: 60551E-1-60551E-10. vol. 6055, No. 27.

International Search Report issued in Intl. Appln. No. PCT/JP2019/010590 dated May 28, 2019. English translation provided.

Written Opinion issued in Intl. Appln. No. PCT/JP2019/010590 dated May 28, 2019. English translation provided.

Vuylsteke. "Range Image Acquisition with a Single Binary-Encoded Light Pattern." IEEE Transactions on Pattern Analysis and Machine Intelligence. Feb. 1990: 148-164. vol. 12, No. 2.

* cited by examiner

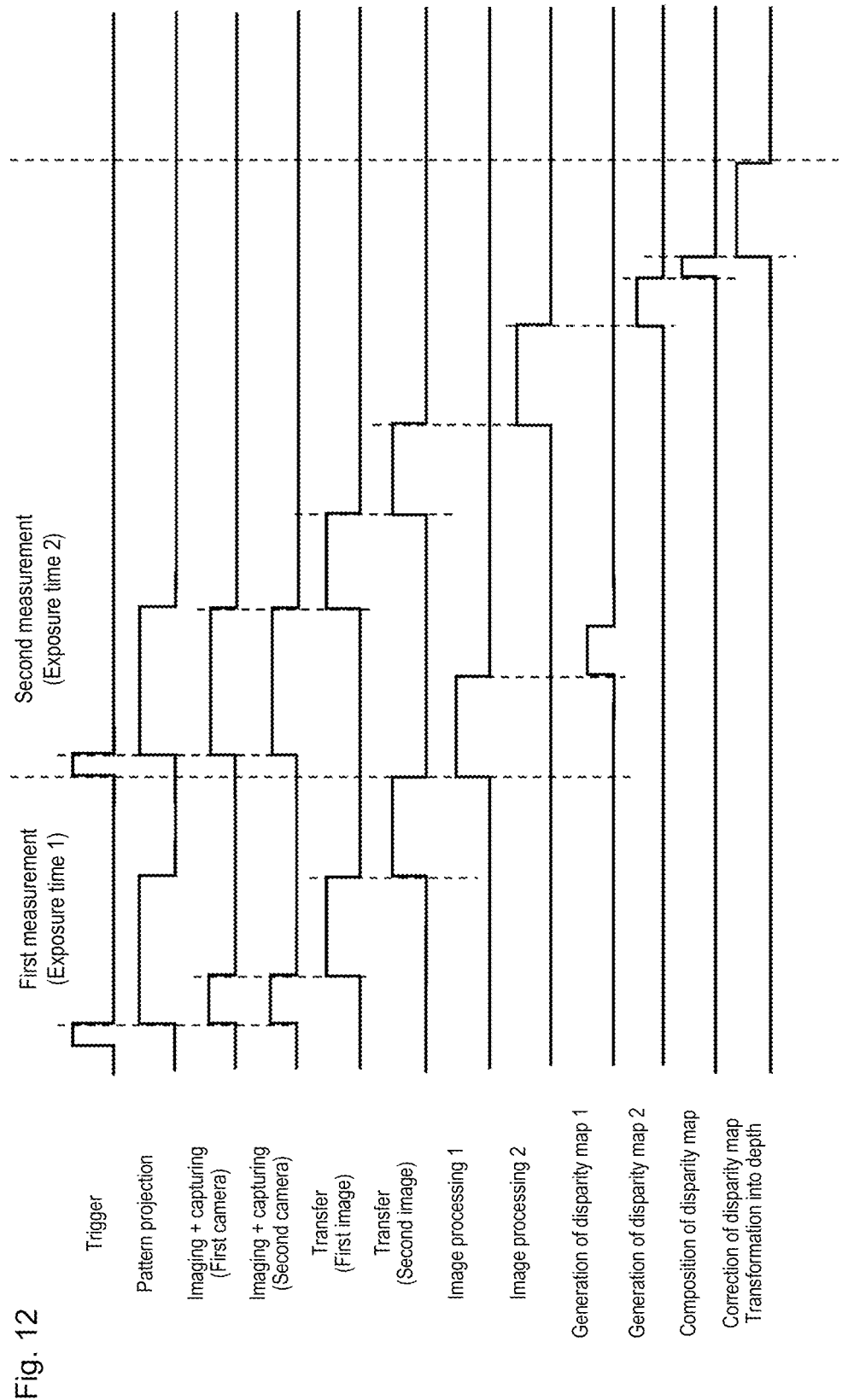

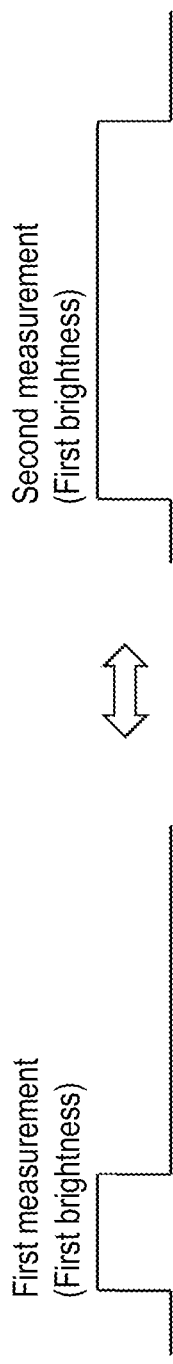
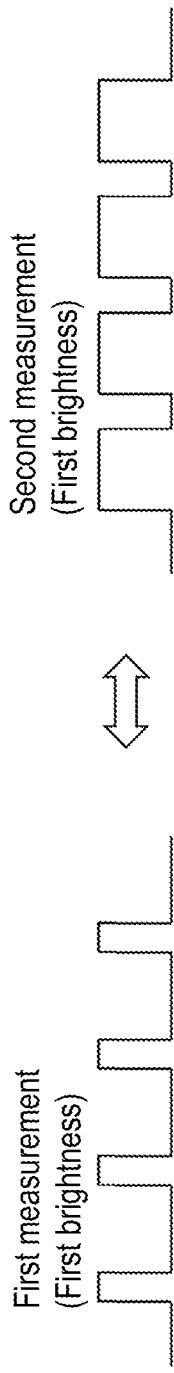
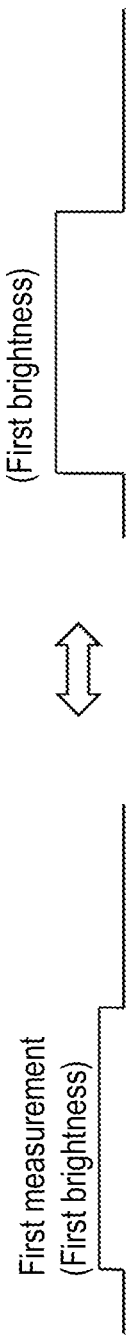

IMAGE PROCESSING DEVICE AND THREE-DIMENSIONAL MEASURING SYSTEM

TECHNICAL FIELD

The present invention relates to three-dimensional measurement using an image.

BACKGROUND ART

Various methods for three-dimensional measurement of an object are known in the related art, and such methods are broadly classified, based on properties of light, into a method based on the rectilinear propagation property of light and a method based on the speed of light. Of the methods, the method based on the rectilinear propagation property of light includes methods classified into an active measuring (active measurement type) method or a passive measuring (passive measurement type) method, and the method based on the speed of light includes methods classified into the active measuring (active measurement type) method.

Non-Patent Document 1 discloses, as a specific example of a space-coded pattern projection method, an example of the active measuring method, a method for obtaining a three-dimensional shape by projecting space-coded pattern illumination to an object and analyzing a taken image of the object onto which the pattern has been projected.

Further, as an example of the passive measuring method, so-called stereo matching (also referred to as stereo vision) for measuring a three-dimensional shape of an object based on two images taken from different viewpoints is known (see Patent Documents 1, 2). FIG. 14 shows the principle of stereo matching. In stereo matching, for example, two cameras arranged side by side concurrently take an image of an object O to obtain two images. With one of the two images denoted as a reference image 11 and the other denoted as a comparison image 12, a pixel (corresponding point P2) that is most similar in image feature to a pixel (reference point P1) in the reference image 11 is searched for along an epipolar line E in the comparison image 12, and a difference in coordinates (disparity) between the reference point P1 and the corresponding point P2 is obtained. A geometrical position of each camera is known, so that a distance D (depth) in a depth direction can be calculated from the disparity based on the principle of triangulation, thereby allowing a three-dimensional shape of the object O to be restored.

PRIOR ART DOCUMENTS

Patent Document

Patent Document 1: Japanese Unexamined Patent Publication No. H05-303629
Patent Document 2: Japanese Unexamined Patent Publication No. 2012-248221

Non-Patent Document

Non-Patent Document 1: P. Vuylsteke and A. Oosterlinck, Range Image Acquisition with a Single Binary-Encoded Light Pattern, IEEE PAMI 12 (2), pp. 148-164, 1990.

SUMMARY OF THE INVENTION

Problems to be Solved by the Invention

Under a measuring method using an image such as stereo matching, differences in reflection characteristics of the surface of the object or changes in environment such as illumination tend to cause variations and deterioration in measurement accuracy. For example, when illumination light is specularly reflected off the surface of a metal part to cause halation, or when dark part gradation is lost due to an object with low reflectance such as rubber, the amount of information required for distance estimation becomes insufficient, which may lead to a significant reduction in accuracy or may disable measurement. Further, a case where illumination intensity is insufficient, a case where the object is not sufficiently illuminated by being shaded by a different object, or a case where light reflected off the different object impinges on the object (so-called mutual reflection) may adversely affect measurement accuracy.

Patent Documents 1, 2 disclose an idea of performing, in order to increase measurement accuracy, stereo matching a plurality of times on the same object and compositing the results. However, repeatedly performing the stereo matching known in the related art may produce an effect of reducing variations, but such an effect cannot be expected in a case where the amount of image information is insufficient.

The present invention has been made in view of the above-described circumstances, and it is therefore an object of the present invention to provide a technique for increasing accuracy and robustness in measurement based on stereo matching.

Means for Solving the Problem

Provided according to an aspect of the present invention is an image processing device configured to generate a depth map based on stereo matching using an image pair, the depth map corresponding to data containing coordinates of each pixel and distance information, the coordinates of each pixel and the distance information being associated with each other, the image processing device including an image capture unit configured to capture the image pair made up of a first image and a second image, the first image and the second image being taken from different viewpoints, a disparity estimating unit configured to estimate a disparity between the first image and the second image based on a method different from the stereo matching, a setting unit configured to set, based on the disparity thus estimated, a search range for a corresponding point for the stereo matching, a disparity map generating unit configured to search only the search range thus set for a corresponding point of each pixel between the first image and the second image and generate a disparity map based on a result of the search, the disparity map corresponding to data containing the coordinates of each pixel and disparity information, the coordinates of each pixel and the disparity information being associated with each other, a disparity map compositing unit configured to composite a plurality of the disparity maps each generated from a corresponding one of a plurality of the image pairs to generate a composite disparity map, and a depth map generating unit configured to transform the disparity information of the composite disparity map into the distance information and generate the depth map.

The above-described configuration restricts the search range for a corresponding point based on the estimated disparity. This not only allows a significant reduction in time required for the corresponding point search, but also allows an increase in accuracy and reliability of the corresponding point search because the search for a corresponding point can be made within a narrowed range having a greater probability that a corresponding point exists, as compared with the typical stereo matching known in the related art.

Further, an effect of complementing a part that is difficult to measure under the stereo matching can be expected through the use of the estimated disparity generated based on a method different from the stereo matching. Then, since the disparity maps obtained from the plurality of image pairs are composited, variations in measurement can be reduced. Therefore, as a whole, highly accurate and highly reliable measurement results can be stably obtained.

The disparity estimating unit may generate a plurality of the estimated disparities, and the setting unit may use a composite estimated disparity obtained by compositing the plurality of estimated disparities to set a search range for the plurality of image pairs. Generating (measuring) the estimated disparity a plurality of times as described above allows a further increase in accuracy and robustness.

The disparity estimating unit may generate a plurality of the estimated disparities, and the setting unit may change the estimated disparity used for setting the search range for each of the plurality of image pairs. Generating (measuring) the estimated disparity a plurality of times as described above allows a further increase in accuracy and robustness.

When the disparity estimating unit is configured to generate the estimated disparity from an image taken by a camera, the plurality of estimated disparities may be generated from different images taken by different cameras and/or under different imaging conditions. Even when an object with different reflection characteristics exists in the field of view, or there is concern about shadow or mutual reflection of objects, taking images with different cameras and/or under different imaging conditions increases the possibility that the disparity information can be extracted from at least any one of the images.

For example, the image capture unit may capture a first image pair and a second image pair, the disparity estimating unit may generate a first estimated disparity from the first image of the first image pair and generate a second estimated disparity from the second image of the second image pair, and the setting unit may use a composite estimated disparity obtained by compositing the first estimated disparity and the second estimated disparity to set a search range for the first image pair and the second image pair. Alternatively, the image capture unit may capture the first image pair and the second image pair, the disparity estimating unit may generate the first estimated disparity from the first image of the first image pair and generate the second estimated disparity from the second image of the second image pair, and the setting unit may use one of the first estimated disparity or the second estimated disparity to set the search range for the first image pair and uses the other of the first estimated disparity or the second estimated disparity to set the search range for the second image pair.

Since the first image and the second image are taken from different viewpoints, estimating a disparity from both the images allows a highly accurate estimated disparity to be obtained. Further, even when some information on one of the images is lost, it is highly likely that the disparity can be estimated from the other image. This allows the search range for a corresponding point to be set more suitably and allows a further increase in accuracy and robustness. Making the image used for the generation of the estimated disparity identical to the image used for the stereo matching allows a reduction in the number of times of imaging and image transfer and in turn allows an increase in efficiency and speed of the overall processing. Further, since the same camera may be used, it is also possible to simplify the device configuration and reduce the size of the device configuration.

The plurality of image pairs may include at least two image pairs taken under different imaging conditions. Such an increase in variation of the images used for the stereo matching allows, even when an object with different reflection characteristics exists in the field of view, or there is concern about shadow or mutual reflection of objects, three-dimensional information to be extracted from at least any of the image pairs. For example, the at least two image pairs taken under the different imaging conditions may include image pairs taken under different exposure conditions and/or different illumination conditions.

The disparity estimating unit may estimate the disparity based on distance information obtained based on a space-coded pattern projection method as the method different from the stereo matching. This is because, when an image sensor identical in resolution to the stereo matching is used, the space-coded pattern projection method allows the distance information to be obtained in a much shorter processing time than the stereo matching. Note that although the space-coded pattern projection method is lower in spatial resolution of distance measurement than the stereo matching method, it can be said that it is necessary and sufficient for the disparity estimation.

Provided according to another aspect of the present invention is a three-dimensional measuring system including a sensor unit including at least two cameras, and the image processing device configured to generate a depth map from an image captured from the sensor unit.

The present invention may be regarded as an image processing device including at least some of the above-described units, or may be regarded as a three-dimensional measuring system including the sensor unit and the image processing device. Further, the present invention may be regarded as image processing including at least some of the above-described processing, a three-dimensional measuring method, a distance measuring method, a control method of the image processing device, or the like, or may be regarded as a program for executing such a method or a recording medium that non-temporarily stores the program. It should be noted that the above-described units and processing may be combined with each other to an allowable degree to form the present invention.

Effect of the Invention

According to the present invention, it is possible to increase accuracy and robustness in measurement based on stereo matching.

BRIEF DESCRIPTION OF THE DRAWINGS

FIG. 12 is a timing chart according to the fifth embodiment.

FIGS. 13A to 13C are diagrams showing an example of how to regulate brightness of a pattern projector.

MODE FOR CARRYING OUT THE INVENTION

Application Example

Figure 1:
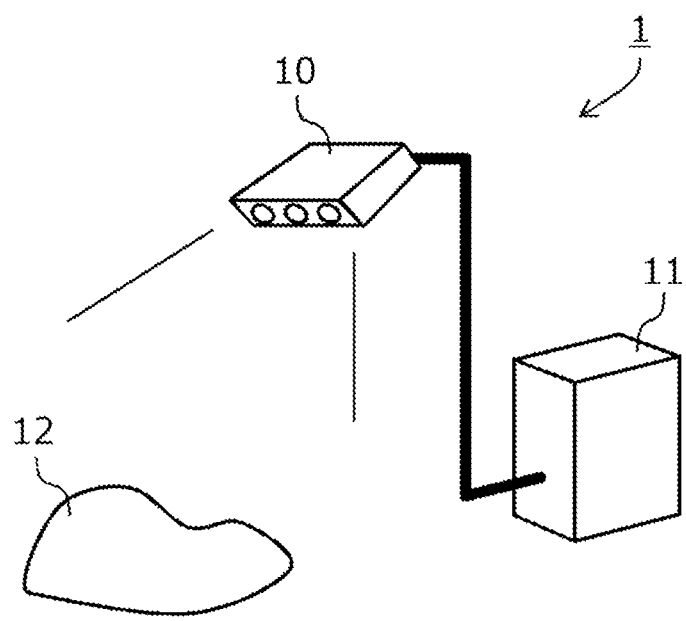
FIG. 1 is a diagram schematically showing a configuration example of a three-dimensional measuring system, which is one of application examples of the present invention.

FIG. 1 is a diagram schematically showing a configuration example of a three-dimensional measuring system, which is one of the application examples of the present invention. The three-dimensional measuring system 1 is a system that measures a three-dimensional shape of an object 12 based on image sensing, and the three-dimensional measuring system 1 primarily includes a sensor unit 10 and an image processing device 11. The sensor unit 10 includes at least a camera (also referred to as an image sensor or an imaging device) and may include another sensor as needed. The output of the sensor unit 10 is captured by the image processing device 11. The image processing device 11 is a device that performs various types of processing on the data captured from the sensor unit 10. The processing performed by the image processing device 11 may include, for example, distance measurement (ranging function), three-dimensional shape recognition, object recognition, scene recognition, or the like. A result of the processing performed by the image processing device 11 is output to an output device such as a display or transferred to the outside for inspection, control of another device, or the like. Such a three-dimensional measuring system 1 is applied to a wide range of fields, including, for example, computer vision, robot vision, and machine vision.

Note that the configuration shown in FIG. 1 is merely an example, and the hardware configuration may be suitably designed in accordance with the application of the three-dimensional measuring system 1. For example, the sensor unit 10 and the image processing device 11 may be connected by radio, or alternatively, the sensor unit 10 and the image processing device 11 may be integrated into a single device. Further, the sensor unit 10 and the image processing device 11 may be connected over a LAN or a wide area network such as the Internet. Further, a plurality of sensor units 10 may be provided for a single image processing device 11, or conversely, the output of a single sensor unit 10 may be provided to a plurality of image processing devices 11. Further, the sensor unit 10 may be attached to a robot or a mobile body to make the viewpoint of the sensor unit 10 changeable.

Figure 2:
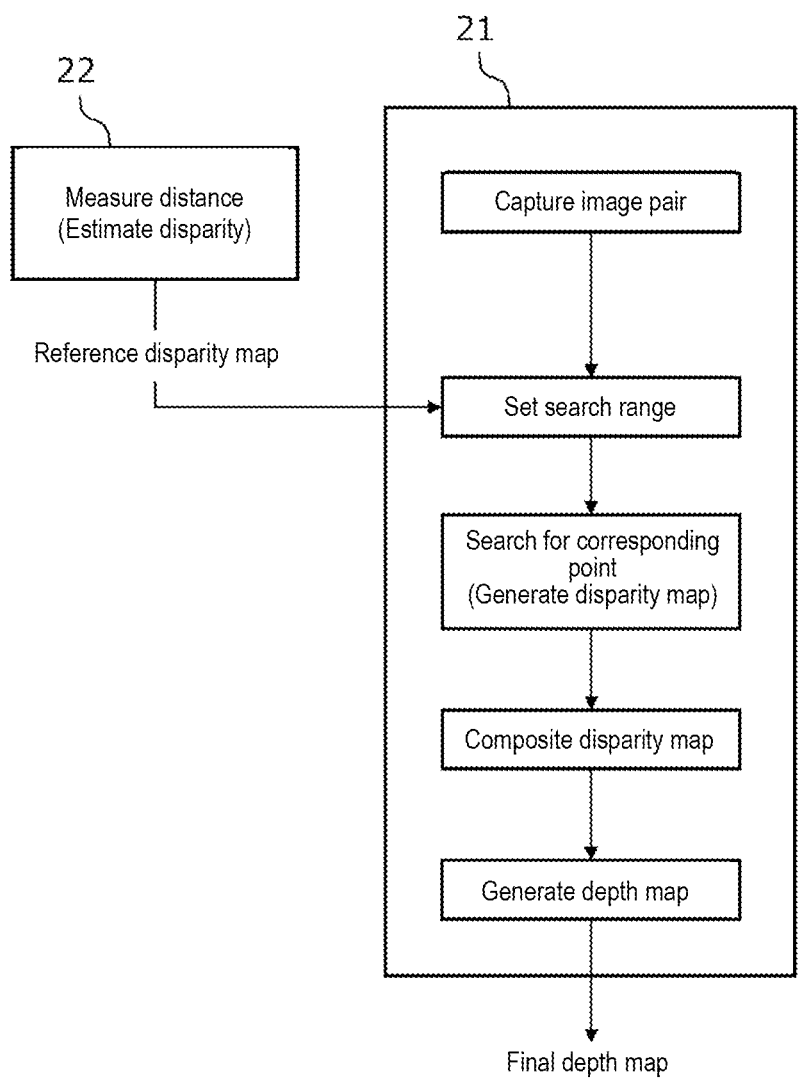
FIG. 2 is a diagram schematically showing an outline of functions of and processing performed by the three-dimensional measuring system.

FIG. 2 is a diagram schematically showing an outline of functions of and processing performed by the three-dimensional measuring system 1. The three-dimensional measuring system 1 includes two measuring systems, a first measuring system 21 and a second measuring system 22, as measuring systems for measuring a distance to the object 12. Functions of and processing performed by the measuring systems 21, 22 are implemented by the sensor unit 10 and the image processing device 11 that operate in a cooperative manner.

The first measuring system 21 measures a depth distance (depth) to the object 12 based on stereo matching (also referred to as, for example, stereo vision or stereo-camera method). Since the stereo matching enables measurement with high spatial resolution, distance information generated by the first measuring system 21 serves as a final output of the three-dimensional measuring system 1.

On the other hand, the second measuring system 22 also measures the distance to the object 12, but distance information obtained by the second measuring system 22 is used in an auxiliary manner for roughly estimating a disparity observed by the first measuring system 21 and narrowing a search range for the stereo matching. As the second measuring system 22, any measuring system may be used as long as the distance measurement is made based on a method different from the stereo matching.

The active measuring method, one of the three-dimensional measuring methods, based on the rectilinear propagation property of light includes a space-coded pattern projection method, a time-coded pattern projection method, a moire topography method (contour line method), a photometric stereo method (illumination direction/Photometric Stereo), and the like that are based on triangulation, and further includes a photometric method, a confocal laser method, a white confocal method, an optical interference method, and the like that are based on coaxial ranging. Further, the passive measuring method based on the rectilinear propagation property of light includes a volume intersection method (Shape from silhouette), a factorization method (factorization), a Depth from Motion (Structure from Motion) method, a Depth from Shading method, and the like, and further includes a Depth from focusing method, a Depth from defocus method, a Depth from zoom method, and the like that are based on coaxial ranging. Further, the active measuring method based on the speed of light include an optical time difference (TOF) measuring method, an optical phase difference (TOF) measuring method that are based on coaxial ranging, and a time-of-flight (TOF) method based on radio waves, sound waves, and millimeter waves.

Any of the above-described methods may be applied to the second measuring system 22. However, since the second measuring system 22 is configured to roughly estimate the disparity, the second measuring system 22 may be lower in measurement accuracy and spatial resolution than the stereo matching, and it is therefore preferable that a high-speed method that is shorter in measurement time than the stereo matching should be used. According to the embodiments described below, the space-coded pattern projection method is applied from the viewpoint that the measurement time is shorter, and the sensor and the image can be shared with the first measuring system 21.

Next, a description will be given of a general flow of the measurement processing performed by the three-dimensional measuring system 1 with reference to FIG. 2.

(1) The first measuring system 21 captures a stereo image pair made up of two images (referred to as a first image and a second image) from the sensor unit 10. The two images are obtained by imaging the object 12 from different viewpoints (sight line directions) so as to cause a disparity with respect to the object 12. When the sensor unit 10 includes a plurality of cameras, the first image and the second image may be concurrently taken by two cameras. Alternatively, the first image and the second image may be taken by a single camera that consecutively performs imaging while moving.

(2) The second measuring system 22 measures the distance to the object 12, estimates the disparity between the first image and the second image based on information on the distance thus obtained, and uses the disparity thus estimated as a reference disparity map. Herein, the disparity map generated by the second measuring system 22 is referred to as the "reference disparity map" in order to distinguish it from the disparity map generated by the first measuring system 21 based on the stereo matching. The reference disparity map is used in an auxiliary manner for narrowing the search range for the stereo matching in the first measuring system 21, so that the reference disparity map may be lower (coarser) in spatial resolution than the first image and the second image. Note that the reference disparity map may be generated in the image processing device 11 based on the image captured from the sensor unit 10 or different sensing data, or alternatively, when the sensor unit 10 itself has a function (such as a TOF image sensor) of measuring a distance, the reference disparity map may be generated in the sensor unit 10.

(3) The first measuring system 21 sets the search range for a corresponding point based on the stereo matching using the reference disparity map obtained from the second measuring system 22. As described above, since the spatial resolution or accuracy of the reference disparity map is not so high, it is inevitable that the estimated disparity includes some error. Therefore, the search range for a corresponding point may be set so as to contain the range of the error. For example, when the value of the estimated disparity is d [pixel] and the error is ±derr [pixel], the search range may be set to a range of from d−derr−c to d+derr+c. c represents a margin. Note that the search range may be set for each of all the pixels of the first image, or when a change in local disparity in the image is not large, the first image is divided into a plurality of areas, and the search range may be set for each area.

(4) The first measuring system 21 searches the search range thus set for a corresponding point of each pixel between the first image and the second image. For example, when the first image serves as a reference image and the second image serves as a comparison image, a pixel in the second image that is most similar in image feature to a pixel (reference point) in the first image is selected as a corresponding point, and a difference in coordinates between the reference point and the corresponding point is determined to be a disparity at the reference point. The corresponding point search is performed on all the pixels in the first image, and a disparity map is generated from the results of the search. The disparity map corresponds to data containing the coordinates of each pixel and disparity information, the coordinates of each pixel and the disparity information being associated with each other.

(5) The first measuring system 21 performs the above-described processing (1) to (4) at least twice to obtain a plurality of disparity maps. Then, the first measuring system 21 generates a composite disparity map by compositing the plurality of disparity maps.

(6) The first measuring system 21 transforms the disparity information of the composite disparity map into distance information (depth) based on the principle of triangulation to generate a depth map.

The above-described configuration restricts the search range for a corresponding point based on the estimated disparity. This not only allows a significant reduction in time required for the corresponding point search, but also allows an increase in accuracy and reliability of the corresponding point search because the search for a corresponding point can be made within a narrowed range having a greater probability that a corresponding point exists, as compared with the typical stereo matching known in the related art. Further, an effect of complementing a part that is difficult to measure under the stereo matching can be expected through the use of the estimated disparity generated based on a method different from the stereo matching. Then, since the disparity maps obtained from the plurality of image pairs are composited, variations in measurement can be reduced. Therefore, as a whole, highly accurate and highly reliable measurement results can be stably obtained.

First Embodiment

Figure 3:
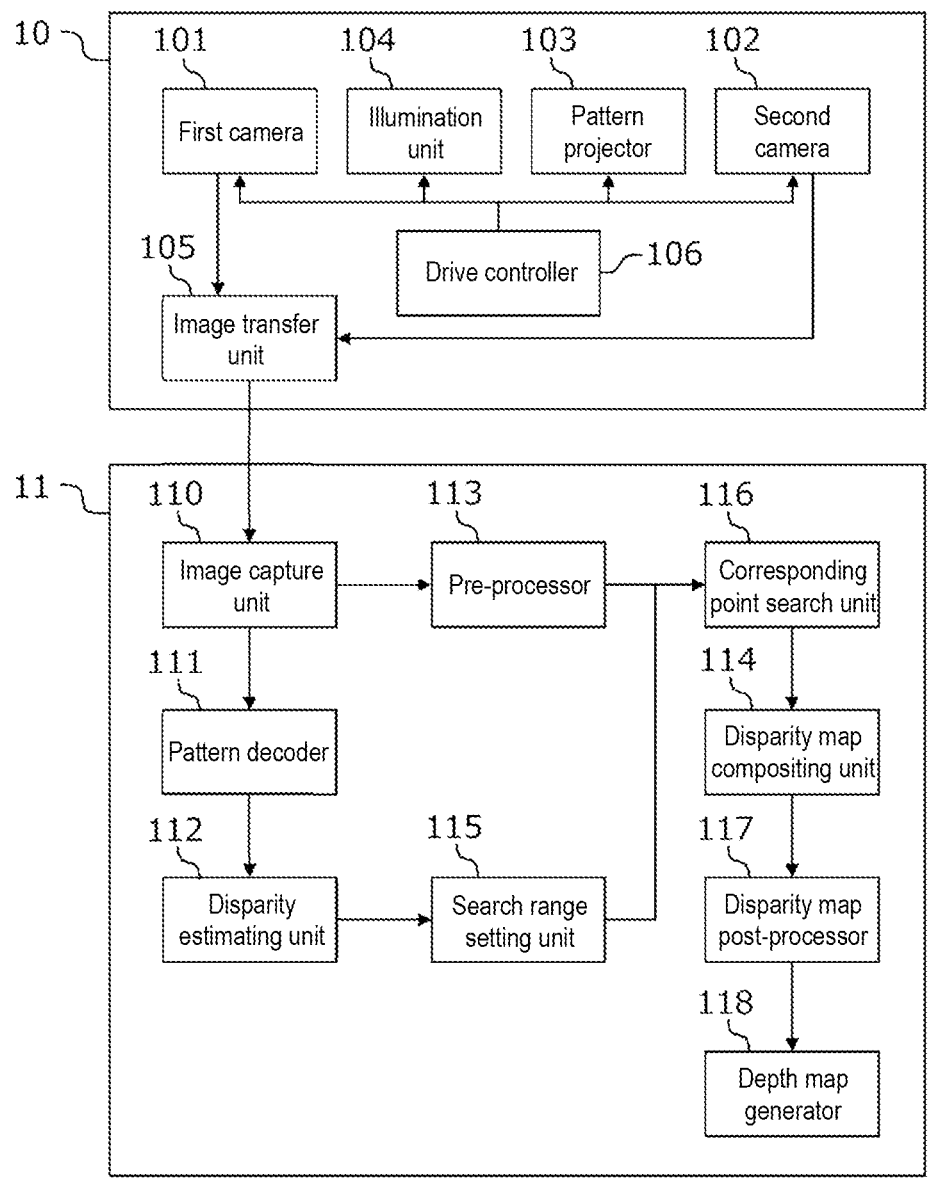
FIG. 3 is a functional block diagram of the three-dimensional measuring system according to a first embodiment.

A description will be given, with reference to FIG. 3, of a configuration example of the three-dimensional measuring system 1 according to the first embodiment. FIG. 3 is a functional block diagram of the three-dimensional measuring system 1.

(Sensor Unit)

The sensor unit 10 includes a first camera 101, a second camera 102, a pattern projector 103, an illumination unit 104, an image transfer unit 105, and a drive controller 106.

The first camera 101 and the second camera 102 are a pair of cameras serving as a so-called stereo camera and are arranged at a predetermined distance from each other. Concurrent imaging by the two cameras 101, 102 makes it possible to obtain an image pair taken from different viewpoints (the image taken by the first camera 101 is referred to as the first image, and an image taken by the second camera 102 is referred to as the second image). The two cameras 101, 102 may be arranged such that their optical axes intersect each other, and their horizontal lines (or vertical lines) are flat on the same plane. Such an arrangement makes the epipolar line parallel to the horizontal lines (or vertical lines) of the images, so that the corresponding point can be searched for within the same horizontal lines (or vertical lines) based on the stereo matching, and the search processing can be simplified accordingly. Note that as the cameras 101, 102, either a monochrome camera or a color camera may be used.

The pattern projector 103 is a device, also referred to as a projector, that projects, onto the object 12, pattern illumination for use in distance measurement based on the space-coded pattern projection method. The pattern projector 103 includes, for example, a light source, a light guide lens, a pattern generator, a projection lens, and the like. As the light source, an LED, a laser, a vertical cavity surface-emitting laser (VCSEL), or the like may be used. The light guide lens is an optical element that guides light from the light source to the pattern generator, and the light guide lens may be a lens, a glass rod, or the like. The pattern generator is a member or device that generates a coded pattern, and the pattern generator may be a photomask, a diffractive optical element (for example, diffractive optical element (DOE)), an optical modulation element (for example, digital light processing (DLP), liquid crystal display (LCD), liquid crystal on silicon (LCoS), or micro electro mechanical systems (MEMS)), or the like. The projection lens is an optical element that magnifies and projects a generated pattern.

The illumination unit 104 is uniform illumination used for taking a general visible light image. For example, white LED illumination is used. Alternatively, illumination identical in wavelength band to the active projection may be used.

The image transfer unit 105 transfers data of the first image taken by the first camera 101 and data of the second image taken by the second camera 102 to the image processing device 11. The image transfer unit 105 may transfer the first image and the second image as separate image data, or may connect the first image and the second image to generate a side-by-side image and transfer the side-by-side image as single image data. Further, the image transfer unit 105 may connect a plurality of images taken under different imaging conditions (for example, a plurality of images taken with different exposure times) to generate a side-by-side image and transfer the side-by-side image as single image data. The drive controller 106 is a unit that controls the first camera 101, the second camera 102, the pattern projector 103, and the illumination unit 104. Note that the image transfer unit 105 and the drive controller 106 may be provided in the image processing device 11 rather than in the sensor unit 10.

(Image Processing Device)

The image processing device 11 includes an image capture unit 110, a pattern decoder 111, a disparity estimating unit 112, a pre-processor 113, a search range setting unit 115, a corresponding point search unit 116, a disparity map compositing unit 114, a disparity map post-processor 117, and a depth map generator 118.

The image capture unit 110 has a function of capturing necessary image data from the sensor unit 10. The image capture unit 110 sends an image pair made up of the first image and the second image to the pattern decoder 111 and the pre-processor 113.

The pattern decoder 111 has a function of extracting distance information from the first image or the second image based on the space-coded pattern projection method. Under the space-coded pattern projection method, the spatial resolution is determined in a manner that depends on the size of a unit pattern used. For example, when a unit pattern of 5 pixels×5 pixels is used, the spatial resolution of the distance information results in 1/25 of the input image. The disparity estimating unit 112 has a function of estimating a disparity between the first image and the second image based on the distance information extracted by the pattern decoder 111 and outputting a reference disparity map.

The pre-processor 113 has a function of performing necessary preprocessing on the first image and the second image. The search range setting unit 115 has a function of setting a search range for a corresponding point based on the disparity thus estimated. The corresponding point search unit 116 has a function of searching for a corresponding point between the first image and the second image and generating a disparity map based on a result of the search. The disparity map compositing unit 114 has a function of generating the composite disparity map by compositing a plurality of disparity maps each generated from a corresponding one of a plurality of image pairs. The disparity map post-processor 117 has a function of performing necessary post-processing on the composite disparity map. The depth map generator 118 has a function of transforming the disparity information of the composite disparity map into the distance information and generating a depth map.

The image processing device 11 is, for example, a computer including a CPU (processor), a RAM (memory), a non-volatile storage device (hard disk, SSD, etc.), an input device, an output device, and the like. Such a configuration causes the CPU to load a program stored in the non-volatile storage device into the RAM and execute the program to implement the various functions described above. However, the configuration of the image processing device 11 is not limited to the above-described configuration, and all or some of the above-described functions may be implemented by an application specific circuit such as FPGA or ASIC, or may be implemented by cloud computing or distributed computing.

According to this example, the first camera 101, the pattern projector 103, the image transfer unit 105, the image capture unit 110, the drive controller 106, the pattern decoder 111, and the disparity estimating unit 112 make up the second measuring system 22 shown in FIG. 2, and the first camera 101, the second camera 102, the pattern projector 103, the image transfer unit 105, the drive controller 106, the pre-processor 113, the search range setting unit 115, the corresponding point search unit 116, the disparity map compositing unit 114, the disparity map post-processor 117, the depth map generator 118 make up the first measuring system 21 shown in FIG. 2.

(Measurement Processing)

Figure 4:
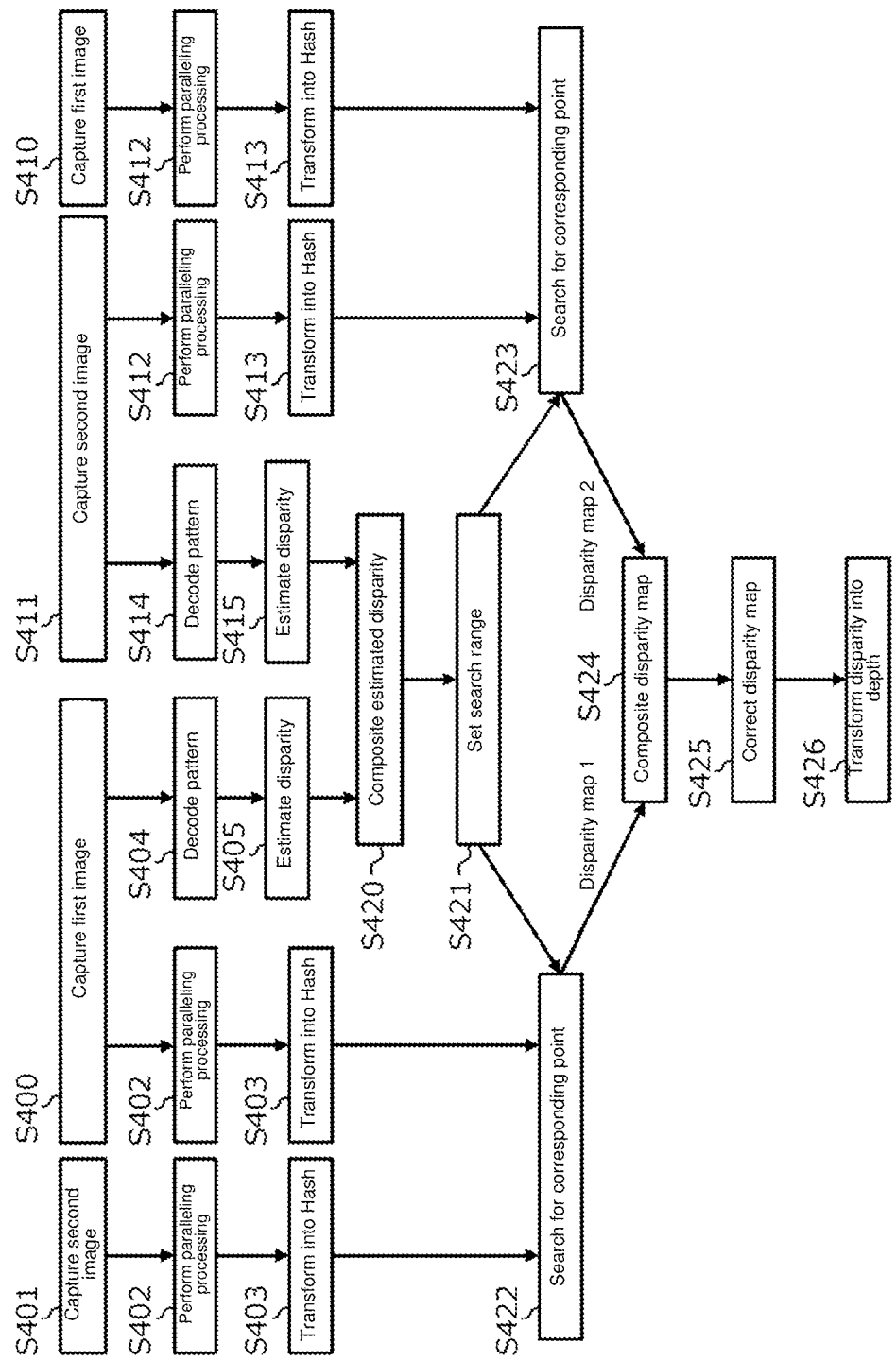
FIG. 4 is a flowchart showing a flow of measurement processing according to the first embodiment.
Figure 5:
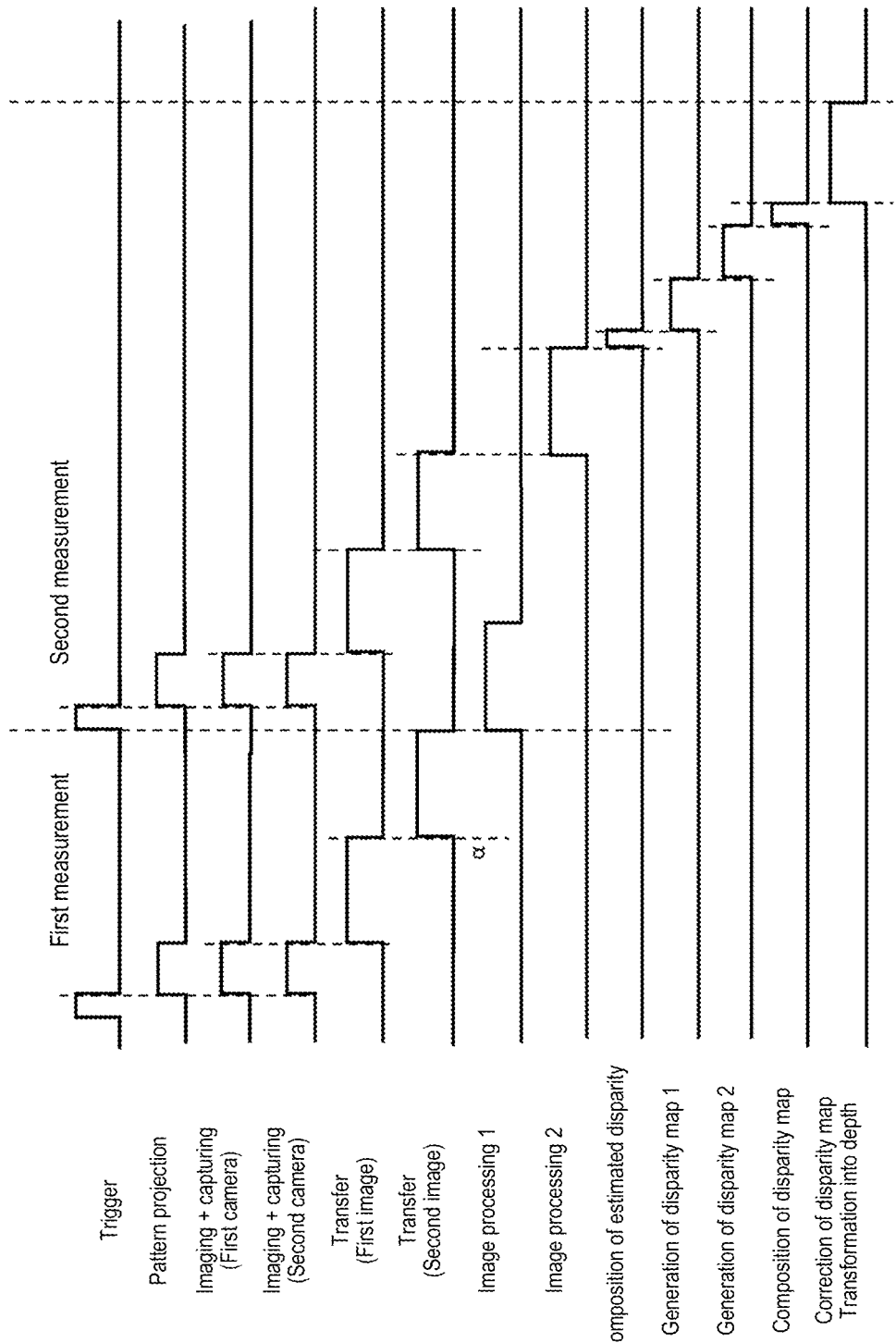
FIG. 5 is a timing chart according to the first embodiment.

A description will be given of a flow of measurement processing according to the first embodiment with reference to FIGS. 4 and 5. FIG. 4 is a flowchart showing a flow of processing performed by the image processing device 11. FIG. 5 is a timing chart.

A start signal from the drive controller 106 triggers a first measurement. First, the pattern projector 103 lights up to project predetermined pattern illumination onto the object 12. Then, the first camera 101 and the second camera 102 concurrently take images, and the image transfer unit 105 transfers the first image and the second image. In steps S400, S401, the image capture unit 110 captures a first image pair made up of the first image and the second image. The image capture unit 110 sends the first image to the pattern decoder 111 and sends the first image and the second image to the pre-processor 113.

Subsequently, the start signal from the drive controller 106 triggers a second measurement. First, the pattern projector 103 lights up to project predetermined pattern illumination onto the object 12. Then, the first camera 101 and the second camera 102 concurrently take images, and the image transfer unit 105 transfers the first image and the second image. In steps S410, S411, the image capture unit 110 captures a second image pair made up of the first image and the second image. The image capture unit 110 sends the second image to the pattern decoder 111 and sends the first image and the second image to the pre-processor 113.

In parallel with the second measurement, image processing on the first image pair obtained in the first measurement is started. In step S402, the pre-processor 113 performs paralleling processing (rectification) on the first image and the second image. The paralleling processing is processing of geometrically transforming either or both of two images such that corresponding points between the two images are on the same horizontal line (or vertical line) of the images. The paralleling processing makes the epipolar line parallel to the horizontal lines (or vertical lines) of the images, thereby making the subsequent corresponding point search processing simple. Note that when the parallelism between the images captured from the sensor unit 10 is sufficiently high, the paralleling processing need not be performed.

In step S403, the pre-processor 113 calculates a hash feature value for each pixel of the first image and the second image made parallel to each other, and replaces the value of each pixel with the hash feature value. The hash feature value represents a luminance feature in a local region centered on a pixel of interest, and the hash feature value used here is a bit string of eight elements. As described above, transforming luminance values of each image into the hash feature values significantly increases efficiency of similarity calculation of the local luminance feature in the subsequent corresponding point search.

In step S404, the pattern decoder 111 analyzes the first image and decodes the pattern to obtain distance information in the depth direction on a plurality of points on the first image.

In step S405, the disparity estimating unit 112 calculates, based on the distance information on each point obtained in step S404, two-dimensional coordinates when each point is projected onto an image coordinate system of the first image and two-dimensional coordinates when the same point is projected onto an image coordinate system of the second image, the first image and the second image being made parallel to each other, and calculates a difference in coordinates between the first image and the second image. This difference corresponds to the estimated disparity. The disparity estimating unit 112 obtains the estimated disparity for all the points on which the distance information has been obtained in step S404, and outputs the data as the reference disparity map.

Note that the processing on the first image may be started upon the end of the transfer of the first image (a in FIG. 5) to reduce the total processing time.

Upon the end of the transfer of the second image pair obtained in the second measurement, the image processing on the second image pair is started. In step S412, the pre-processor 113 performs paralleling processing (rectification) on the first image and the second image. In step S413, the pre-processor 113 calculates a hash feature value for each pixel of the first image and the second image made parallel to each other, and replaces the value of each pixel with the hash feature value. In step S414, the pattern decoder 111 analyzes the second image and decodes the pattern to obtain distance information based on the second image. Then, in step S415, the disparity estimating unit 112 calculates the estimated disparity based on the distance information.

Theoretically, the estimated disparity obtained in the first time (step 3405) and the estimated disparity obtained in the second time (step S415) should be the same, but in reality are not exactly the same. This is because images taken by different cameras (taken from different viewpoints) are used in the first and second times, and there is a difference in appearance (that is, image information) between the images. This may cause a difference in estimated disparity value between the first and second times, or may cause a situation where one succeeds in disparity estimation but the other fails. Therefore, in step S420, the disparity estimating unit 112 composites the first estimated disparity and the second estimated disparity to obtain the composite estimated disparity. The compositing method is not particularly limited, but, for example, when both the first estimated disparity and the second estimated disparity have been obtained, an average value of the estimated disparities may be used as the composite estimated disparity, whereas when only either the first estimated disparity or the second estimated disparity has been obtained, the estimated disparity thus obtained may be used as the composite estimated disparity.

In step S421, the search range setting unit 115 sets, based on the composite estimated disparity, the search range for a corresponding point for both the first image pair and the second image pair. The size of the search range is determined in consideration of estimation error. For example, when the estimation error is ±10 pixels, setting the search range to about ±20 pixels, including a margin, centered on the estimated disparity is considered sufficient. Assuming that each horizontal line has 640 pixels and the search range can be narrowed to ±20 pixels (that is, 40 pixels), the search processing can be simply reduced to $\frac{1}{16}$ compared to searching the whole horizontal line.

In step S422, the corresponding point search unit 116 searches for a corresponding point between the first image pair and obtains a disparity in each pixel. The corresponding point search unit 116 generates disparity data containing the disparity information and a point (pixel coordinates) where the corresponding point has been successfully detected, the disparity information and the point being associated with each other. This information corresponds to a disparity map 1. Similarly, in step S423, the corresponding point search unit 116 searches for a corresponding point between the second image pair and generates a disparity map 2.

In step S424, the disparity map compositing unit 114 composites the disparity map 1 obtained from the first image pair and the disparity map 2 obtained from the second image pair to generate the composite disparity map. The compositing method is not particularly limited, but, for example, when disparities have been obtained in both the disparity map 1 and the disparity map 2, an average value of the disparities may be used as a composite disparity, whereas when disparities have been obtained in only either the disparity map 1 or the disparity map 2, the disparities thus obtained may be used as the composite disparity.

In step S425, the disparity map post-processor 117 corrects the composite disparity map. The disparity map estimated by the corresponding point search contains erroneously measured points, missing measurement, and the like, so that correction of the erroneously measured points and compensation for the missing measurement are made based on disparity information on surrounding pixels. Note that either step S424 or step S425 may be performed first. In step S426, the depth map generator 118 transforms the disparity information on each pixel of the composite disparity map into three-dimensional information (distance information in the depth direction) to generate a depth map. This depth map (three-dimensional point group data) is used, for example, for shape recognition or object recognition of the object 12.

The configuration and processing according to the first embodiment described above allows not only a significant reduction in time required for the corresponding point search, but also an increase in accuracy and reliability of the corresponding point search, as compared with the typical stereo matching known in the related art. Further, an effect of complementing a part that is difficult to measure under the stereo matching can be expected through the use of the estimated disparity generated based on the space-coded pattern projection method. Then, since the disparity maps obtained from the plurality of image pairs are composited, variations in measurement can be reduced. Therefore, as a whole, highly accurate and highly reliable measurement results can be stably obtained.

Further, estimating the disparity from both the first image and the second image allows a highly accurate estimated disparity to be obtained. Further, even when some information on one of the images is lost, it is highly likely that the disparity can be estimated from the other image. This allows the search range for a corresponding point to be set more suitably and allows a further increase in accuracy and robustness. Making the image used for the generation of the estimated disparity identical to the image used for the stereo matching allows a reduction in the number of times of imaging and image transfer and in turn allows an increase in efficiency and speed of the overall processing. Further, since the same camera may be used, it is also possible to simplify the device configuration and reduce the size of the device configuration.

Second Embodiment

Figure 6:
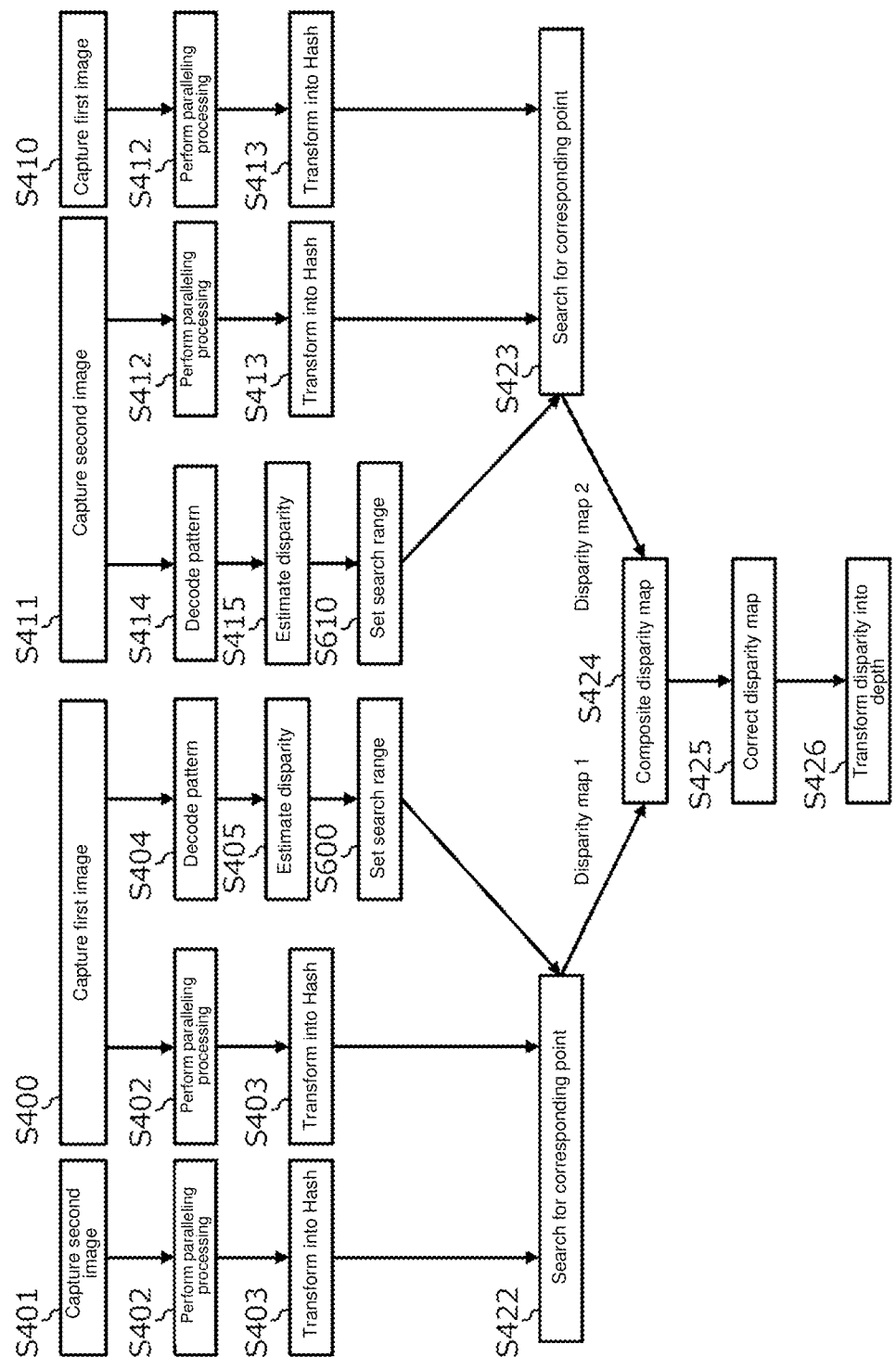
FIG. 6 is a flowchart showing a flow of measurement processing according to a second embodiment.
Figure 7:
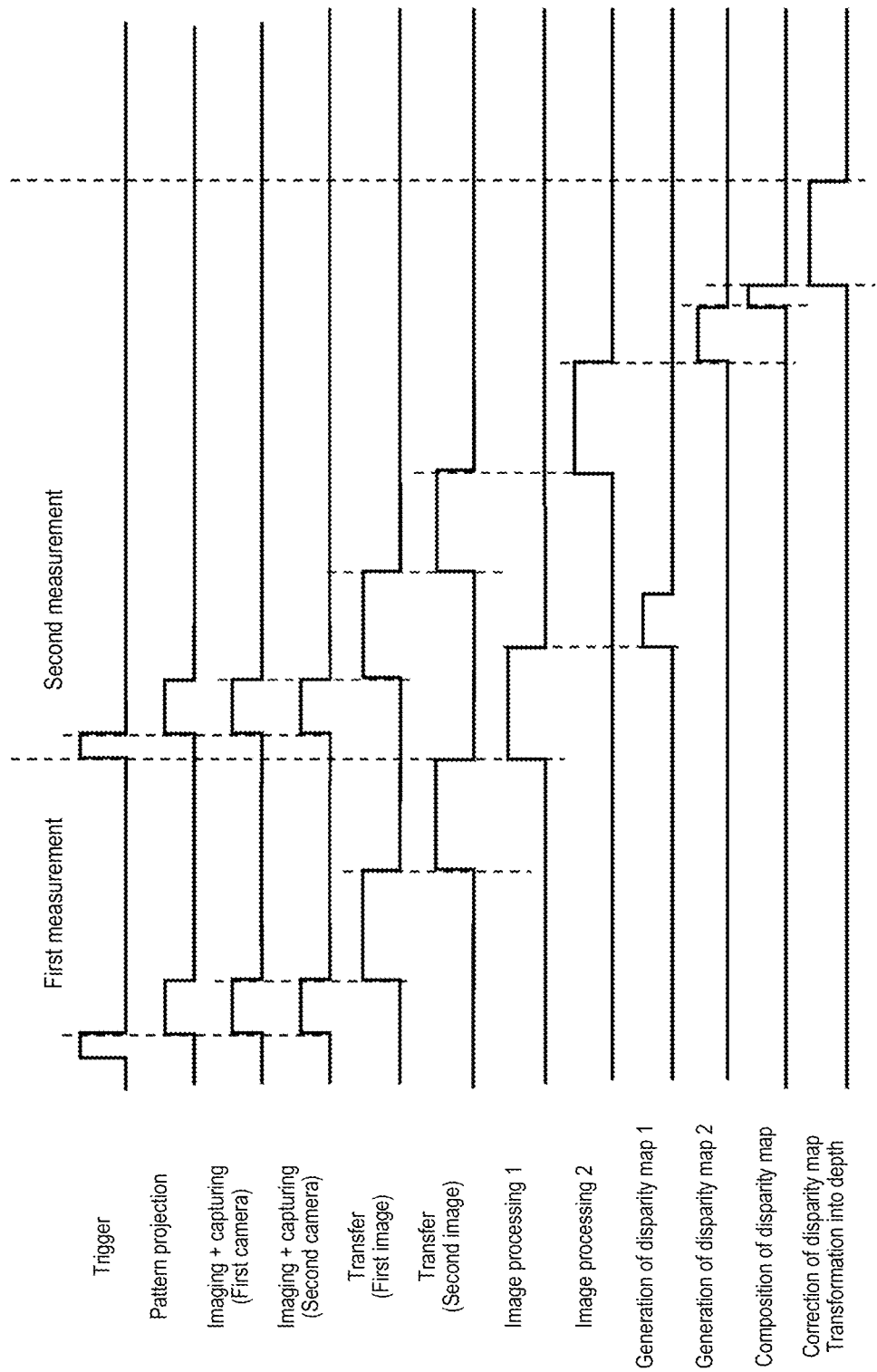
FIG. 7 is a timing chart according to the second embodiment.

A description will be given of a flow of measurement processing according to a second embodiment with reference to FIGS. 6 and 7. FIG. 6 is a flowchart showing a flow of processing performed by the image processing device 11. FIG. 7 is a timing chart. According to the first embodiment, the estimated disparity obtained from the first image and the estimated disparity obtained from the second image are composited, and the search range is set based on the composite estimated disparity, whereas according to the second embodiment, the search range is set based on individual disparities (steps S600, S610). The other processing is the same as in the first embodiment; therefore, the same reference numerals as in FIG. 4 will be assigned to the other processing, and no description will be given of the other processing.

The configuration and processing according to the embodiment can produce the same effects as in the first embodiment. In addition, in the processing according to the embodiment, the estimated disparities are not composited; therefore, as shown in FIG. 7, upon the end of image processing 1 (that is, when the estimated disparity for the first image pair has been obtained), processing of generating the disparity map 1 can be immediately started. Therefore, the total processing time can be reduced as compared with the first embodiment.

Third Embodiment

Figure 8:
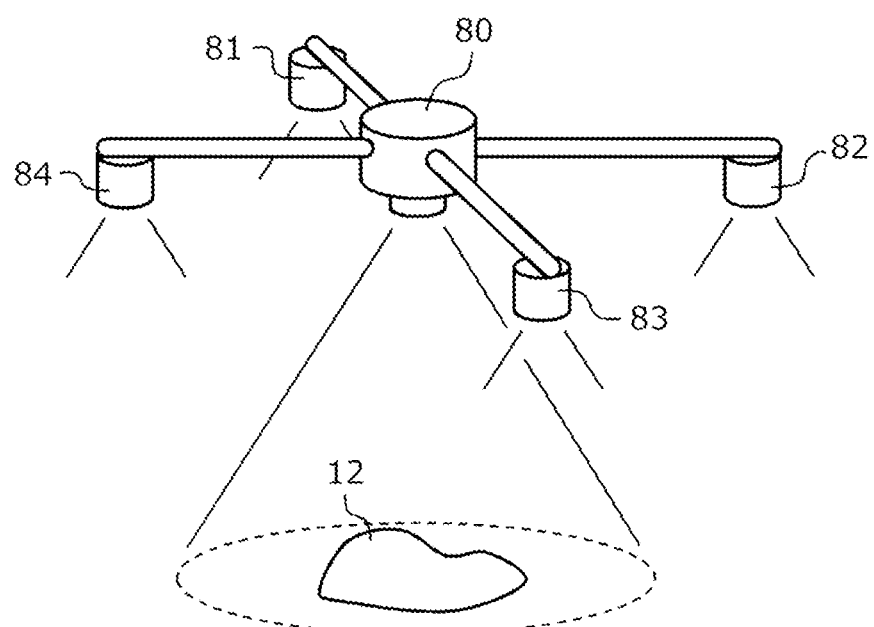
FIG. 8 is a diagram showing a configuration example of a sensor unit according to a third embodiment.

FIG. 8 schematically shows a configuration of the sensor unit 10 of the three-dimensional measuring system according to a third embodiment. The sensor unit 10 according to the embodiment has a structure where four cameras 81, 82, 83, 84 are arranged around a pattern projector 80.

In the measurement processing, the four cameras 81 to 84 concurrently take images with the pattern illumination projected from the pattern projector 80 onto the object 12, and four images taken from different viewpoints are captured. An image pair selected from the four images is used for the stereo matching. There are six image pairs available, and any one pair may be selected from the six image pairs, or alternatively, two or more pairs may be selected. For example, an image pair whose horizontal lines or vertical lines are parallel to the epipolar line may be preferentially selected, or alternatively, an image pair having less loss of image information may be preferentially selected. The other configuration and processing is the same as in the above-described embodiments; therefore, no description will be given of the other configuration and processing.

The configuration and processing according to the embodiment can produce the same effects as in the above-described embodiments. In addition, the embodiment enables stereo measurement from multiple viewpoints, thereby allowing a further increase in robustness of measurement. Note that the configuration shown in FIG. 8 has been given as an example, and the arrangement of the pattern projector and cameras, the number of pattern projectors, the number of cameras, and the like can be designed as desired.

Fourth Embodiment

Figure 9:
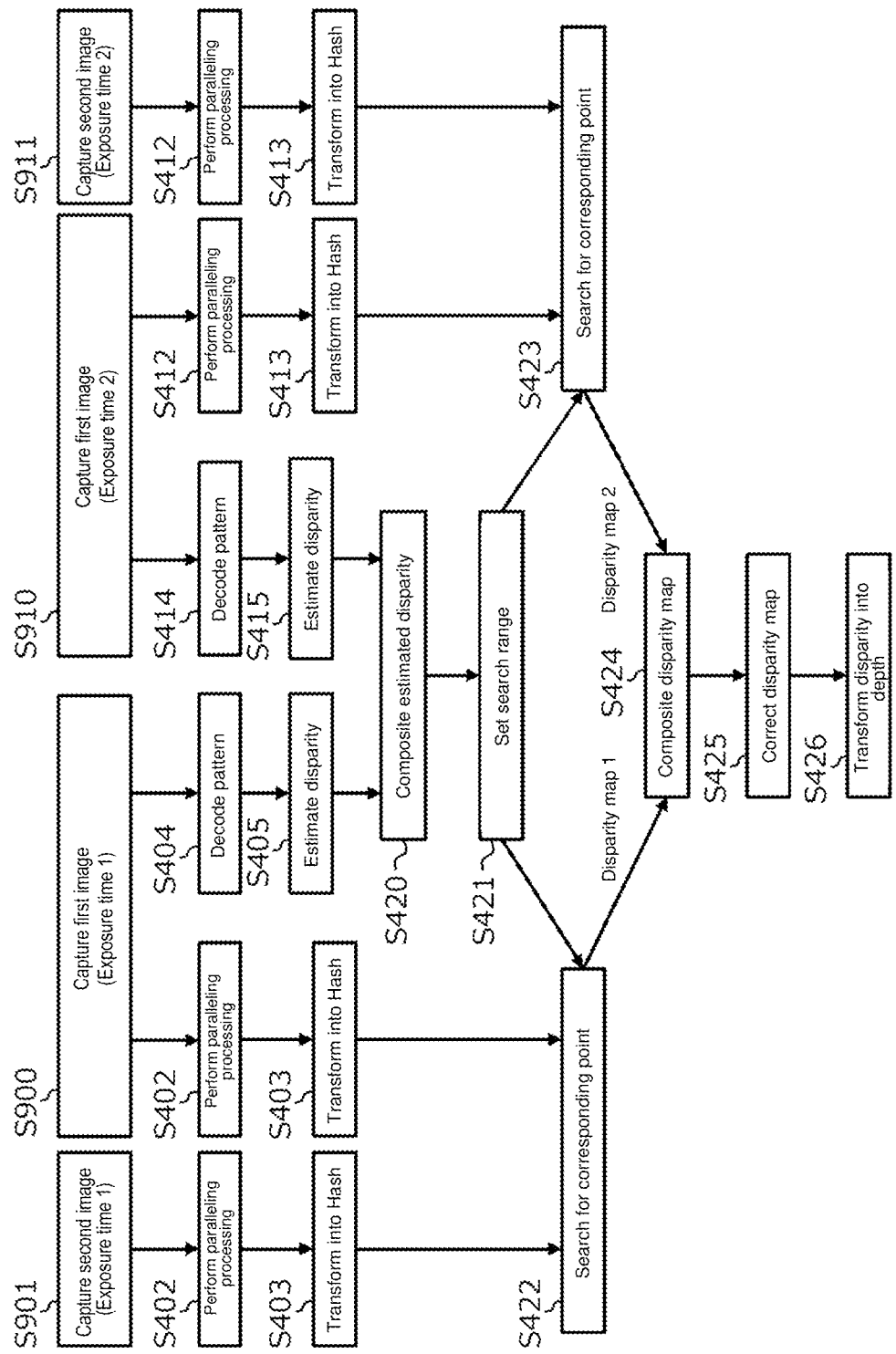
FIG. 9 is a flowchart showing a flow of measurement processing according to a fourth embodiment.
Figure 10:
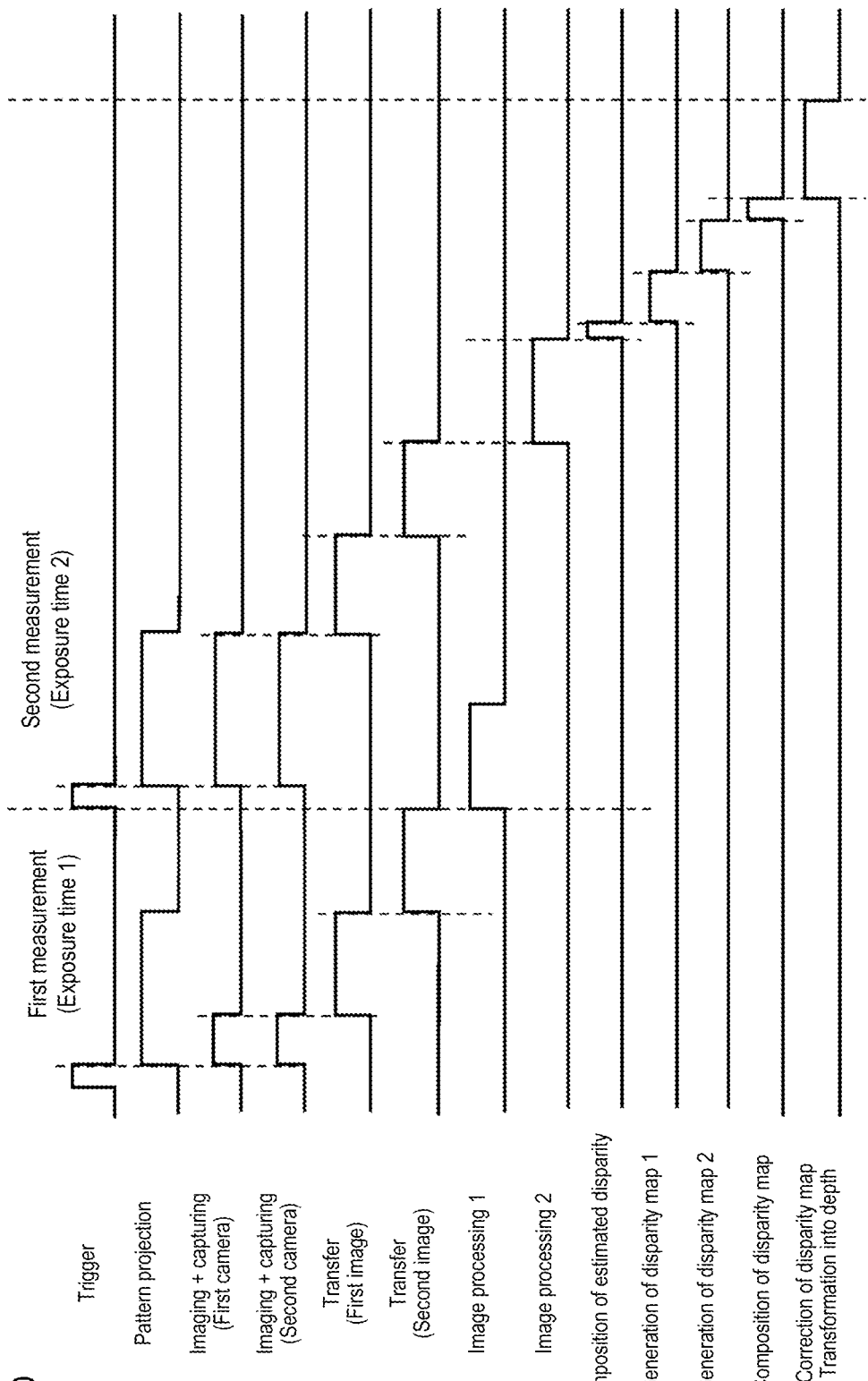
FIG. 10 is a timing chart according to the fourth embodiment.

A description will be given of a flow of measurement processing according to a fourth embodiment with reference to FIGS. 9 and 10. FIG. 9 is a flowchart showing a flow of processing performed by the image processing device 11. FIG. 10 is a timing chart. According to the first embodiment, the first measurement and the second measurement are performed under the same imaging conditions, whereas according to the fourth embodiment, the exposure time is changed between the first measurement and the second measurement.

Specifically, as shown in FIG. 10, in the first measurement, the first and second cameras take images with "exposure time 1", and in the second measurement, the first and second cameras take images with "exposure time 2" (exposure time 2>exposure time 1). Then, as shown in FIG. 9, the image processing device 11 performs stereo matching using the image pair of the first image and the second image taken with the exposure time 1 (steps S900, S901) and further performs stereo matching using the image pair of the first image and the second image taken with the exposure time 2 (steps S910, S911), composites two disparity maps 1, 2 thus obtained, and outputs a final measurement result.

Taking an image with the shorter exposure time 1 allows a reduction in halation (so-called overexposure) and also allows an increase in gradation of a bright region in the image. Therefore, for obtaining three-dimensional information (disparity information) on a mirror-finished object or a bright-colored object, the image taken with the exposure time 1 is more suitable. On the other hand, taking an image with the longer exposure time 2 allows an increase in gradation of a dark region; therefore, for obtaining three-dimensional information (disparity information) on a low-reflectance object or a shaded part, the image taken with the exposure time 2 is more suitable. Therefore, as in the embodiment, compositing the disparity map 1 obtained from the image pair taken with the exposure time 1 and the disparity map 2 obtained from the image pair taken with the exposure time 2 enables three-dimensional measurement robust against differences in reflection characteristics, illumination conditions, and the like. Note that, in the example shown in FIG. 9, two images, the first image taken with the exposure time 1 and the first image taken with the exposure time 2, are used for disparity estimation, but as in the first embodiment, both the first image and the second image may be used for disparity estimation. Further, the configuration where at least three cameras are provided described according to the third embodiment may be applied to the embodiment.

Fifth Embodiment

Figure 11:
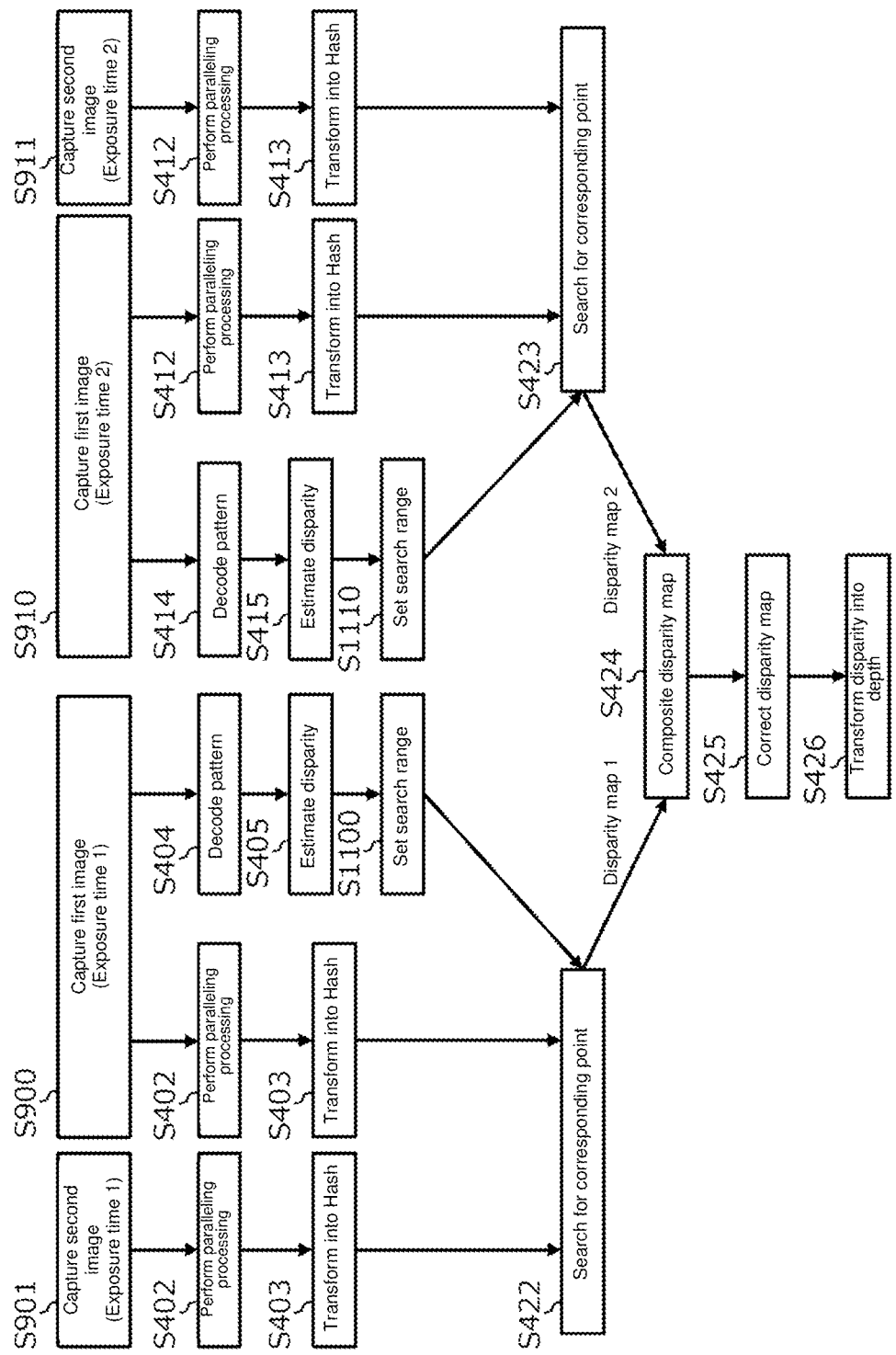
FIG. 11 is a flowchart showing a flow of measurement processing according to a fifth embodiment.
Figure 14:
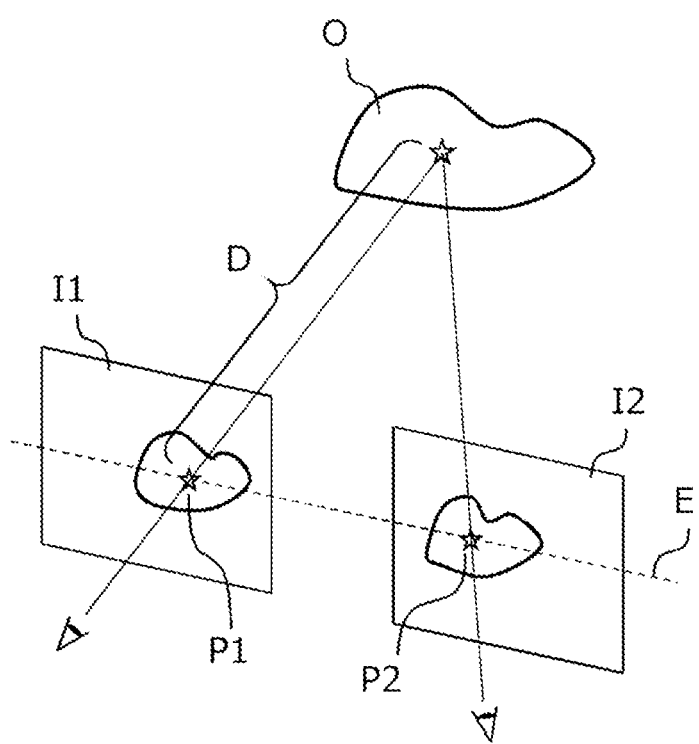
FIG. 14 is a diagram for describing the principle of stereo matching.

A description will be given of a flow of measurement processing according to a fifth embodiment with reference to FIGS. 11 and 12. FIG. 11 is a flowchart showing a flow of processing performed by the image processing device 11. FIG. 12 is a timing chart. According to the fourth embodiment, the search range is set based on the composite estimated disparity, whereas according to the fifth embodiment, the search range is set based on individual disparities (steps S1100, S1110). The other processing is the same as in the fourth embodiment; therefore, the same reference numerals as in FIG. 9 will be assigned to the other processing, and no description will be given of the other processing.

The configuration and processing according to the embodiment can produce the same effects as in the fourth embodiment. In addition, in the processing according to the embodiment, the estimated disparities are not composited; therefore, as shown in FIG. 12, upon the end of the image processing 1 (that is, when the estimated disparity for the first image pair has been obtained), processing of generating the disparity map 1 can be immediately started. Therefore, the total processing time can be reduced as compared with the fourth embodiment. Further, the configuration where at least three cameras are provided described according to the third embodiment may be applied to the embodiment.

Sixth Embodiment

According to the fourth and fifth embodiments, the exposure conditions of the camera are changed, but instead, changing the illumination conditions allows the same processing to be performed. That is, in the first measurement, an image is taken with the pattern projector 103 set to the first brightness, and in the second measurement, an image is taken with the pattern projector 103 changed to the second brightness. At this time, making settings to satisfy "first brightness<second brightness" and making the exposure conditions of the camera identical between the first measurement and the second measurement allows an image suitable for obtaining three-dimensional information (disparity information) on a mirror-finished object or a bright-colored object to be obtained in the first measurement and allows an image suitable for obtaining three-dimensional information (disparity information) on a low-reflectance object or a shaded part to be obtained in the second measurement. Therefore, performing stereo matching using each image pair, compositing the obtained disparity maps, and generating the final measurement result enables the three-dimensional measurement robust against differences in reflection characteristics or illumination conditions.

Examples of the method for regulating the brightness of the pattern projector 103 include a method by which the lighting time is regulated, a method by which the duty cycle is regulated, a method by which the lighting intensity is regulated, and the like, and any method may be used. FIGS. 13A to 13C show examples of drive signals of the pattern projector 103.

OTHERS

The above-described embodiments are merely illustrative of a configuration example according to the present invention. The present invention is not limited to the above-described specific forms, and various modifications may be made within the scope of the technical idea of the present invention. For example, according to the above-described embodiments, the space-coded pattern projection method has been given as an example, but any method other than the stereo matching may be employed as the distance measuring method of the second measuring system. Further, according to the above-described embodiments, the hash feature value is used for the stereo matching, but another method may be used for evaluating the similarity in corresponding point. For example, there is a method for calculating the similarity between pixels of left and right images based on sum of absolute difference (SAD), sum of squared difference (SSD), normalized correlation (NC), or the like as an evaluation index of similarity. Further, according to the above-described embodiments, the camera image common to the generation of the reference depth map (disparity estimation) and the stereo matching is used, but different camera images for three-dimensional measurement may be used.

APPENDIX (1) An image processing device (11) configured to generate a depth map based on stereo matching using an image pair, the depth map corresponding to data containing coordinates of each pixel and distance information, the coordinates of each pixel and the distance information being associated with each other, the image processing device (11) including:
    an image capture unit (110) configured to capture the image pair made up of a first image and a second image, the first image and the second image being taken from different viewpoints;
    a disparity estimating unit (112) configured to estimate a disparity between the first image and the second image based on a method different from the stereo matching;
    a setting unit (115) configured to set, based on the disparity estimated, a search range for a corresponding point for the stereo matching;
    a disparity map generating unit (116) configured to search only the search range set for a corresponding point of each pixel between the first image and the second image and generate a disparity map based on a result of the search, the disparity map corresponding to data containing the coordinates of each pixel and disparity information, the coordinates of each pixel and the disparity information being associated with each other;
    a disparity map compositing unit (114) configured to composite a plurality of the disparity maps each generated from a corresponding one of a plurality of the image pairs to generate a composite disparity map; and
    a depth map generating unit (118) configured to transform the disparity information of the composite disparity map into the distance information and generate the depth map.

DESCRIPTION OF SYMBOLS 1 three-dimensional measuring system
10 sensor unit
image processing device
12 object
21 first measuring system
22 second measuring system

The invention claimed is:
1. An image processing device configured to generate a depth map based on stereo matching using an image pair, the depth map corresponding to data containing coordinates of each pixel and distance information, the coordinates of each pixel and the distance information being associated with each other, the image processing device comprising:
    an image capture unit configured to capture the image pair made up of a first image and a second image, the first image and the second image being taken from different viewpoints;
    a disparity estimating unit configured to estimate a disparity between the first image and the second image based on distance information obtained by a space-coded pattern projection method;
    a setting unit configured to set, based on the disparity estimated, a search range for a corresponding point for the stereo matching;
    a disparity map generating unit configured to search only the search range set for a corresponding point of each pixel between the first image and the second image and generate a disparity map based on a result of the search, the disparity map corresponding to data containing the coordinates of each pixel and disparity information, the coordinates of each pixel and the disparity information being associated with each other;

a disparity map compositing unit configured to composite a plurality of the disparity maps each generated from a corresponding one of a plurality of the image pairs to generate a composite disparity map; and a depth map generating unit configured to transform the disparity information of the composite disparity map into the distance information and generate the depth map.

2. The image processing device according to claim 1, wherein
the disparity estimating unit generates a plurality of the estimated disparities, and
the setting unit uses a composite estimated disparity obtained by compositing the plurality of estimated disparities to set a search range for the plurality of image pairs.

3. The image processing device according to claim 1, wherein
the disparity estimating unit generates a plurality of the estimated disparities, and
the setting unit changes the estimated disparity used for setting the search range for each of the plurality of image pairs.

4. The image processing device according to claim 2, wherein
the disparity estimating unit generates the estimated disparity from an image taken by a camera, and
the plurality of estimated disparities are generated from different images taken by different cameras and/or under different imaging conditions.

5. The image processing device according to claim 2, wherein
the image capture unit captures a first image pair and a second image pair,
the disparity estimating unit generates a first estimated disparity from the first image of the first image pair and generates a second estimated disparity from the second image of the second image pair, and
the setting unit uses a composite estimated disparity obtained by compositing the first estimated disparity and the second estimated disparity to set a search range for the first image pair and the second image pair.

6. The image processing device according to claim 3, wherein
the image capture unit captures a first image pair and a second image pair,
the disparity estimating unit generates a first estimated disparity from the first image of the first image pair and generates a second estimated disparity from the second image of the second image pair, and
the setting unit uses one of the first estimated disparity or the second estimated disparity to set a search range for the first image pair and uses an other of the first estimated disparity or the second estimated disparity to set a search range for the second image pair.

7. The image processing device according to claim 1, wherein
the plurality of image pairs comprise at least two image pairs taken under different imaging conditions.

8. The image processing device according to claim 7, wherein
the at least two image pairs taken under the different imaging conditions comprise image pairs taken under different exposure conditions and/or different illumination conditions.

9. A three-dimensional measuring system comprising:
a sensor unit comprising at least two cameras; and
the image processing device according to claim 1, the image processing device being configured to generate a depth map from an image captured from the sensor unit.

10. A non-transitory computer readable medium storing a program causing a computer to function as each unit of the image processing device according to claim 1.

11. An image processing method for generating a depth map based on stereo matching using an image pair, the depth map corresponding to data containing coordinates of each pixel and distance information, the coordinates of each pixel and the distance information being associated with each other, the image processing method comprising:
capturing a plurality of the image pairs each made up of a first image and a second image, the first image and the second image being taken from different viewpoints;
estimating, for each of the plurality of image pairs, a disparity between the first image and the second image based on distance information obtained by a space-coded pattern projection method;
setting, based on the disparity estimated, a search range for a corresponding point for the stereo matching;
searching, for each of the plurality of image pairs, only the search range set for a corresponding point of each pixel between the first image and the second image and generating a disparity map based on a result of the search, the disparity map corresponding to data containing the coordinates of each pixel and disparity information, the coordinates of each pixel and the disparity information being associated with each other;
compositing a plurality of the disparity maps each generated from a corresponding one of the plurality of image pairs to generate a composite disparity map; and
transforming the disparity information of the composite disparity map into the distance information and generating the depth map.

* * * * *